(12) United States Patent
Tao et al.

(10) Patent No.: US 12,042,920 B2
(45) Date of Patent: Jul. 23, 2024

(54) POWER TOOL

(71) Applicant: Nanjing Chervon Industry Co., Ltd., Nanjing (CN)

(72) Inventors: Shichun Tao, Nanjing (CN); Lai Liu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 62 days.

(21) Appl. No.: 17/977,295

(22) Filed: Oct. 31, 2022

(65) Prior Publication Data
US 2023/0052338 A1 Feb. 16, 2023

Related U.S. Application Data

(63) Continuation of application No. PCT/CN2021/098515, filed on Jun. 7, 2021.

(51) Int. Cl.
*B25F 5/02* (2006.01)
*H01M 50/204* (2021.01)
*H01M 50/247* (2021.01)
*B23D 49/16* (2006.01)
*B23D 51/01* (2006.01)

(52) U.S. Cl.
CPC ............ *B25F 5/02* (2013.01); *H01M 50/204* (2021.01); *H01M 50/247* (2021.01); *B23D 49/162* (2013.01); *B23D 51/01* (2013.01); *H01M 2220/30* (2013.01)

(58) Field of Classification Search
CPC ............ H01M 50/204; H01M 50/247; H01M 2220/30; B25F 5/02; Y02E 60/10; B23D 51/01; B23D 49/162
See application file for complete search history.

(56) References Cited

U.S. PATENT DOCUMENTS

2002/0170185 A1   11/2002   Kondo et al.
2006/0117580 A1   6/2006   Serdynski et al.
(Continued)

FOREIGN PATENT DOCUMENTS

CN   202398895 U   8/2012
CN   206869223 U   1/2018
(Continued)

OTHER PUBLICATIONS

ISA/CN, Int. Search Report issued on PCT application No. PCT/CN2021/098515, dated Aug. 25, 2021, 5 pages.
(Continued)

*Primary Examiner* — Nathaniel C Chukwurah
(74) *Attorney, Agent, or Firm* — Greenberg Traurig, LLP

(57) ABSTRACT

A power tool includes a body, a power assembly, an output member, a clamping device, a battery pack, and a baseplate assembly. The power assembly is disposed in the body. The output member is driven by the power assembly to output power. The clamping device is connected to the output member and used for clamping a work attachment. The battery pack is connected to the body and supplies power to the power assembly. The baseplate assembly is connected to the body and includes a baseplate in contact with a workpiece. The battery pack includes a first support unit, the baseplate includes a second support unit, and the first support unit and the second support unit are disposed in the same support plane.

20 Claims, 13 Drawing Sheets

(56) References Cited

U.S. PATENT DOCUMENTS

2017/0120436 A1* 5/2017 Rudolph ................ B23D 45/16
2018/0290322 A1* 10/2018 Wang .................... B23D 47/00
2019/0299307 A1    10/2019 Jensen
2019/0344461 A1    11/2019 Kamiya

FOREIGN PATENT DOCUMENTS

CN    208787663 U    4/2019
CN    110198816 A    9/2019
CN    213163429 U    5/2021

OTHER PUBLICATIONS

ISA/CN, English translation of Int. Search Report issued on PCT application No. PCT/CN2021/098515, dated Aug. 25, 2021, 4 pages.
ISA/CN, Written Opinion issued on PCT application No. PCT/CN2021/098515, dated Aug. 25, 2021, 8 pages.
ISA/CN, English translation of Written Opinion issued on PCT application No. PCT/CN2021/098515, dated Aug. 25, 2021, 4 pages.

* cited by examiner

POWER TOOL

RELATED APPLICATION INFORMATION

This application is a continuation of International Application Number PCT/CN2021/098515, filed on Jun. 7, 2021, through which this application also claims the benefit under 35 U.S.C. § 119(a) of Chinese Patent Application No. CN 202010546113.7, filed on Jun. 16, 2020, which applications are incorporated herein by reference in their entirety.

BACKGROUND

A jigsaw is widely used in a production process and mainly used for cutting metal and wood. The jigsaw is generally provided with a work attachment. A saw blade is used as a working saw blade of the jigsaw. In operation, the saw blade is mounted on an output head and extends out of a baseplate to be mounted towards a workpiece so that the baseplate abuts against a surface of the workpiece and the workpiece is cut through a reciprocating motion of the saw blade. Saw teeth of the jigsaw are sharpened for sharp cutting, so the saw blade is often removed from the main machine when the jigsaw is not in use, so as to avoid safety hazards to a user due to an exposed saw blade.

However, in short breaks during use, the frequent removal of the saw blade is time-consuming and laborious. Moreover, since the saw blade is exposed out of the baseplate, it is impossible for the jigsaw to stand on a workbench through the baseplate. Therefore, in breaks during use, the user generally lays the jigsaw on the workbench, and the saw blade still has a risk of injuring the user.

On the other hand, a body of the existing jigsaw is generally configured to be arch-shaped, the body is integrally provided, an opening is excavated in the middle to allow a hand of the user to pass through to hold the jigsaw, a horizontally lying grip is provided at the top of the body, and the bottom of the body is connected to the baseplate. In operation, the user holds the top of the body. The preceding body has a bulky structure, and the grip at the top is far away from the baseplate and an output member, resulting in an inflexible operation. Moreover, the bulky body structure prevents the jigsaw from being operated in some narrow spaces, such as in the proximity of a wall surface or at an included angle between two wall surfaces.

Secondly, to be convenient for the user to clearly view a cutting situation, the existing jigsaw is generally provided with a lighting unit at an end of the output member, where the lighting unit is used for irradiating the cutting of the saw blade. However, the existing lighting unit is generally disposed coaxially with an output unit, resulting in a failure to irradiate the cutting at some angles. In addition, the dimensions of existing lighting units are not reasonable. Some lighting units have relatively small dimensions, which are conducive to clear irradiation, but their light covers a relatively small range. Some lighting units have relatively large dimensions, which ensure that the irradiating light can cover a certain range, but the light around the work attachment is disperse and clear irradiation cannot be implemented.

SUMMARY

A power tool includes a body, a power assembly, an output member, a clamping device, a battery pack, and a baseplate assembly.

The power assembly is disposed in the body.

The output member is driven by the power assembly to output power.

The clamping device is connected to the output member and used for clamping a work attachment.

The battery pack is connected to the body and supplies power to the power assembly.

The baseplate assembly is connected to the body and includes a baseplate in contact with a workpiece.

The battery pack includes a first support unit, the baseplate includes a second support unit, and the first support unit and the second support unit are disposed in a same support plane; the first support unit and the second support unit together support the tool so that the tool stands, and the work attachment faces the support plane when the tool stands.

A power tool includes a body, a power assembly, an output member, a clamping device, a battery pack, and a baseplate assembly.

The body includes a first body and a second body, where the first body extends along an up and down direction, the second body extends along a front and rear direction.

The power assembly is disposed in the second body.

The output member is connected to the first body and driven by the power assembly to output power.

The clamping device is connected to the output member and used for clamping a work attachment.

The battery pack is connected to the second body and supplies power to the power assembly.

The baseplate assembly is connected to the body and includes a baseplate in contact with a workpiece.

An outer diameter of the second body is greater than or equal to 35 mm and less than or equal to 65 mm; and a distance between an upper finger stop portion and a lower finger stop portion along the front and rear direction is $\Delta L$, where $-15 \text{ mm} \leq \Delta L \leq 30 \text{ mm}$, $\Delta L$ less than 0 means that the upper finger stop portion is disposed behind the lower finger stop portion, and $\Delta L$ greater than 0 means that the upper finger stop portion is disposed in front of the lower finger stop portion.

A power tool includes a body, a power assembly, an output member, a clamping device, a battery pack, and a baseplate assembly.

The body includes a first body and a second body, where the first body extends along an up and down direction, the second body extends along a front and rear direction.

The power assembly is disposed in the second body.

The output member is connected to the first body and driven by the power assembly to output power.

The clamping device is connected to the output member and used for clamping a work attachment.

The battery pack is connected to the second body and supplies power to the power assembly.

The baseplate assembly is connected to the body and includes a baseplate in contact with a workpiece.

The second body includes an output end, the output member is provided at the output end, a lighting unit is provided at the output end and disposed around or partially around the output member, and the lighting unit is disposed eccentrically to the output member.

A power tool includes a body, a power assembly, an output member, a clamping device, a battery pack, a baseplate assembly, and a speed regulation assembly.

The body includes a first body extending along an up and down direction and a second body extending along a front and rear direction, where the first body is disposed in front of the second body, the first body constitutes a first grip, and the second body constitutes a second grip.

The power assembly is disposed in the second body.

The output member is connected to the first body and driven by the power assembly to output power.

The clamping device is connected to the output member and used for clamping a work attachment.

The battery pack is connected to the second body and supplies power to the power assembly.

The baseplate assembly is connected to the body and includes a baseplate in contact with a workpiece.

The speed regulation assembly includes a speed regulation knob and is electrically connected to the battery pack; where the speed regulation knob is disposed at a top of the first body and includes an axis of rotation about which the speed regulation knob is rotatable, and the axis of rotation is perpendicular to the baseplate, or the axis of rotation is parallel to the baseplate.

DETAILED DESCRIPTION

Figure 1:
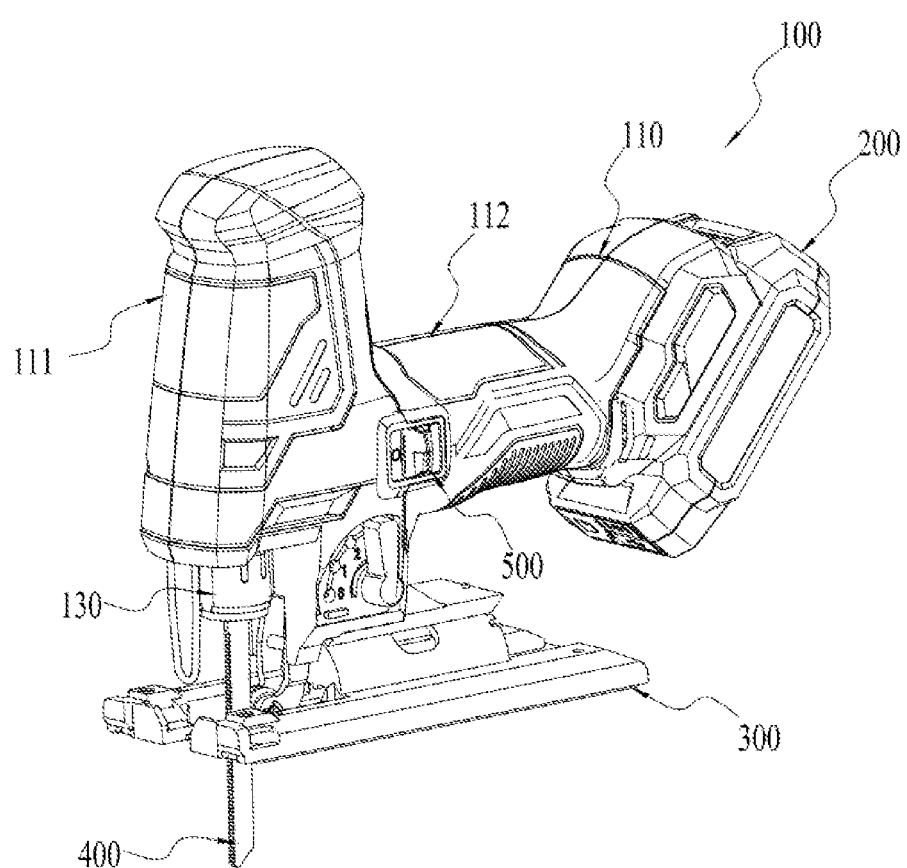
FIG. 1 is a structural view of a jigsaw according to the present application.
Figure 2:
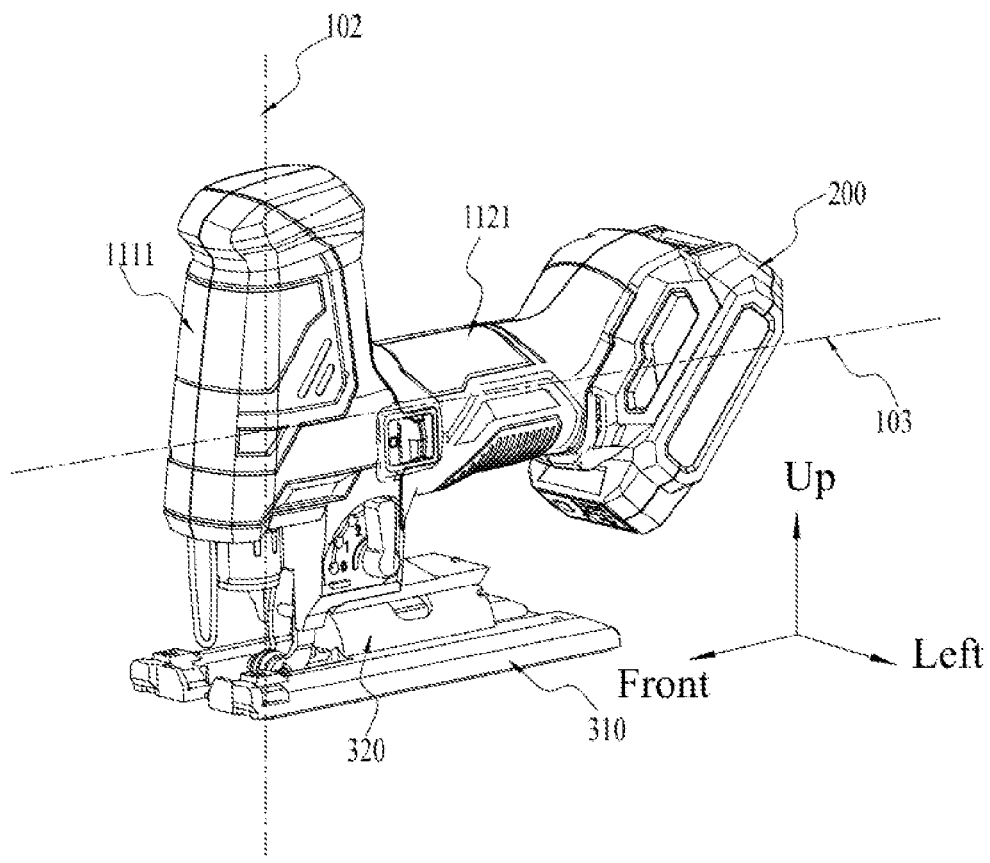
FIG. 2 is a structural view of the jigsaw in FIG. 1 with a work attachment removed.

FIGS. 1 and 2 show a power tool of the present application. The power tool in examples of the present application is specifically a jigsaw 100. The jigsaw in the present application is used for cutting metal, wood and the like and can cut workpieces of different materials depending on different attachments mounted. The power tool in the examples of the present application is specifically the jigsaw.

As shown in FIG. 2, the jigsaw 100 includes a body 110, a power assembly 140, an output member 120, a clamping device 130, a battery pack 200, and a baseplate assembly 300, where the baseplate assembly 300 includes a baseplate 310 in contact with a workpiece.

Referring to FIG. 2, the body 110 includes a first body 111 and a second body 112 connected to each other, where the first body 111 and the second body 112 are disposed at an angle. The first body 111 has a first body axis 102, the second body 112 has a second body axis 103, the first body axis 102 is perpendicular to the baseplate 310, and the second body axis 103 is parallel to the baseplate 310.

In this example, the first body 111 extends along an up and down direction substantially perpendicular to the baseplate assembly 300, and the second body 112 extends along a front and rear direction substantially parallel to the baseplate assembly 300. The up and down direction in the present application refers to a direction parallel to the first body axis 102, a side facing away from the baseplate assembly 300 is above, and a side facing towards the baseplate assembly 300 is below; the front and rear direction refers to a direction parallel to the second body axis 103, a side facing towards the work attachment is the front, and a side facing towards the battery pack is the rear.

Figure 5:
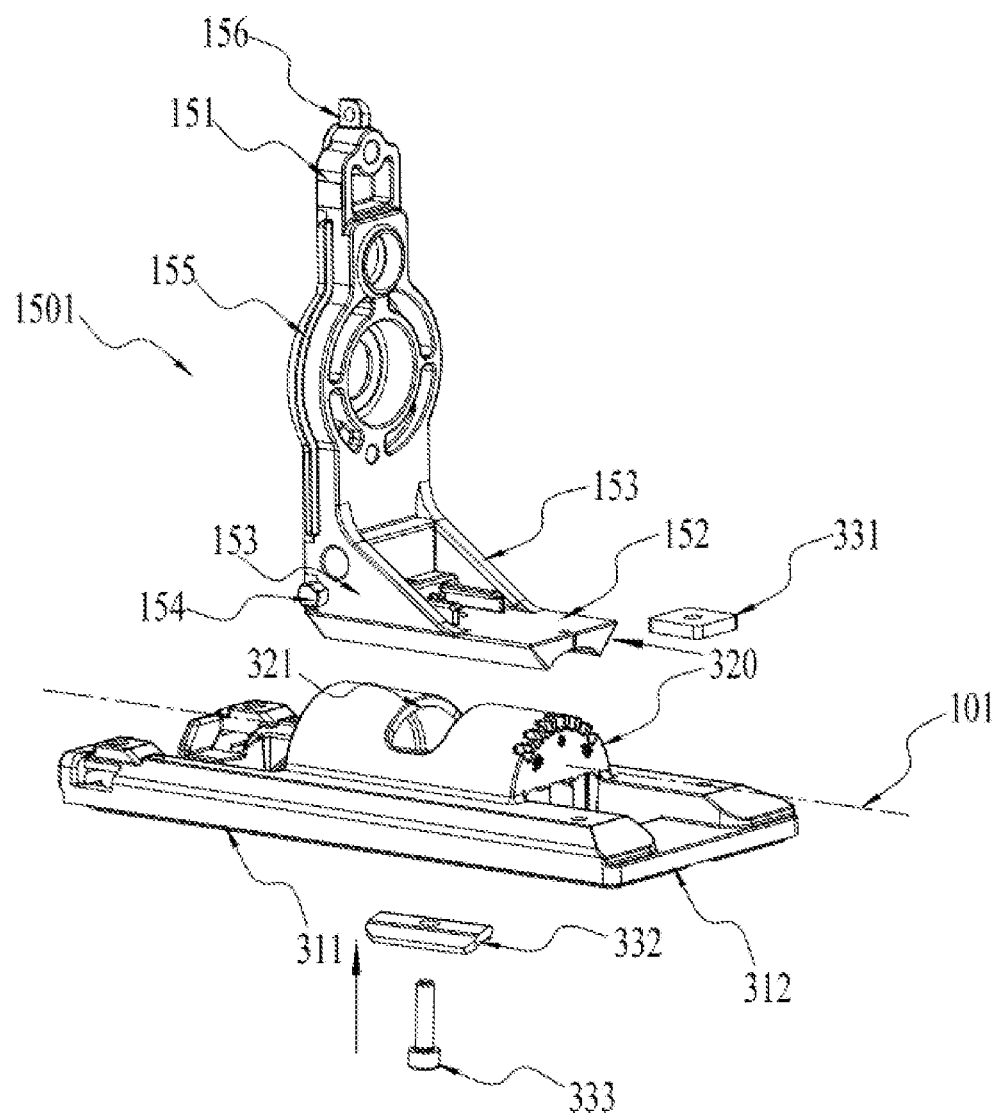
FIG. 5 is a schematic view illustrating the connection between a bearing support and a baseplate assembly of the present application.

As shown in FIG. 5, the baseplate assembly 300 is disposed outside the body 110 and connected to the first body 111, and the baseplate assembly 300 includes the baseplate 310 and a rotary connecting portion 320. The baseplate 310 is in contact with the workpiece, and the rotary connecting portion 320 is rotatably connected to the first body 111. The rotary connecting portion 320 is rotatably connected to the first body 111 about a first axis 101, where the first axis 101 is parallel to a plane where the baseplate 310 is located, thereby achieving the oblique cutting of the jigsaw 100.

Referring to FIG. 5, the baseplate 310 is formed with a baseplate plane in contact with the workpiece, the rotary connecting portion 320 is used for connecting the baseplate 310 to the body 110, the rotary connecting portion 320 has a protrusion from the baseplate 310 towards the body 110, the rotary connecting portion 320 is substantially arch-shaped, and the rotary connecting portion 320 extends substantially in a direction parallel to the first axis 101; and the rotary connecting portion 320 is connected to the body 110 through a connecting assembly.

Figure 3:
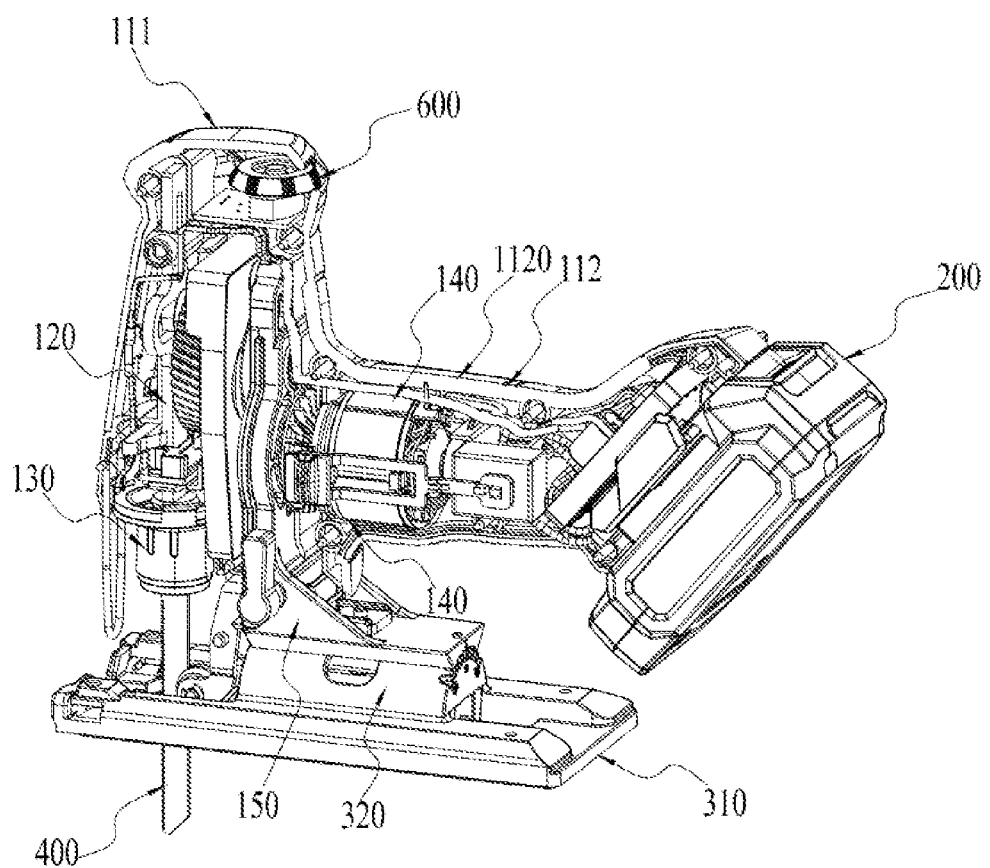
FIG. 3 is a structural view of the jigsaw in FIG. 1 with a left body open.
Figure 4:
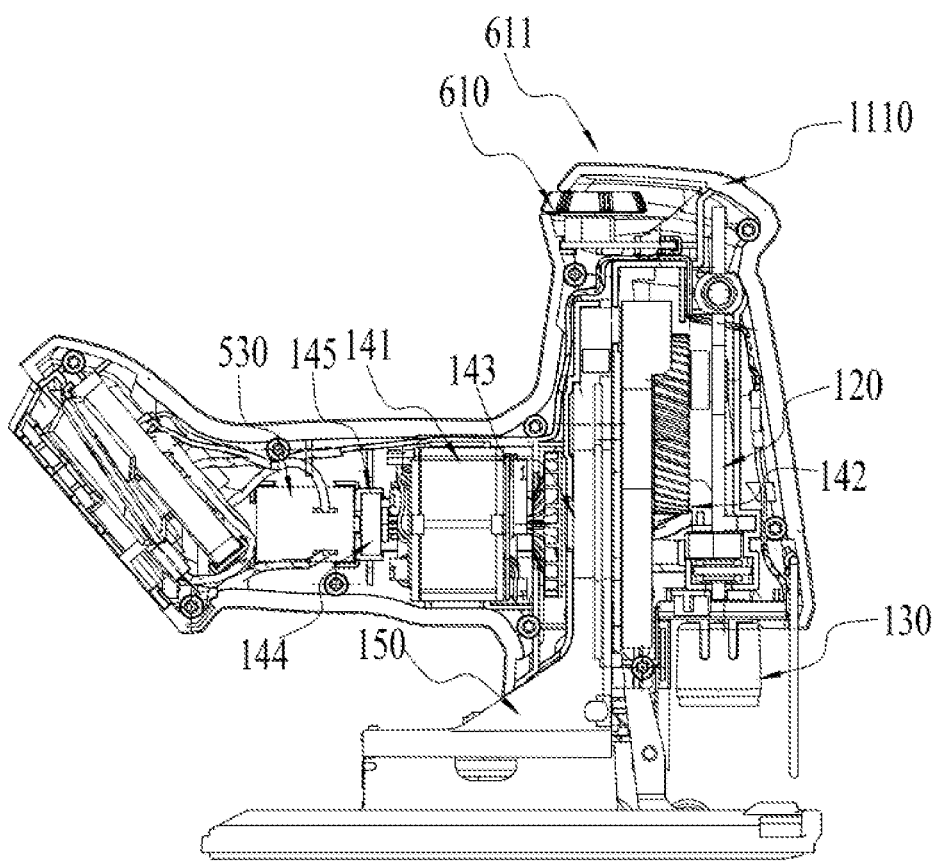
FIG. 4 is a structural view of the jigsaw in FIG. 1 with a right body open.

Referring to FIGS. 3 and 4, the power assembly 140 includes an electric motor 141 and a transmission assembly. The electric motor 141 is connected to the output member 120 through the transmission assembly. In this example, the transmission assembly includes an eccentric gear assembly 142. In the present application, the output member 120 is a reciprocating rod 121 extending along a direction parallel to an axis of the first body 111, and the reciprocating rod 121 is driven by the electric motor 141 to reciprocate.

Specifically, as shown in FIG. 4, the electric motor 141 is disposed in the second body 112, an electric motor gear at an output end of the electric motor is engaged with an eccentric gear, and the rotation of the electric motor 141 drives the rotation of the eccentric gear, thereby driving a reversing lever to reciprocate along the up and down direction.

The clamping device 130 is connected to the reciprocating rod 121 and used for clamping a work attachment 400, and the work attachment 400 in the examples of the present application is a saw blade; where the saw blade is disposed outside the body 110, and saw teeth are formed on one side of the saw blade and used for cutting the workpiece through a reciprocating motion of the saw blade. The clamping device 130 is disposed at an end of the reciprocating rod 121, and part of the work attachment 400 is inserted into and fixed to the clamping device 130. Specifically, a chamber is formed in the clamping device 130, and when a work attachment 400 is mounted to the clamping device 130, part of the operation accessory 400 is accommodated and fixed in the chamber.

As shown in FIG. 4, the electric motor 141 is supported in the second body 112 through an electric motor front bearing 143 and an electric motor rear bearing 144, a rear bearing housing is disposed on an inner wall of a housing of the second body 112, the electric motor rear bearing 144 is supported in the rear bearing housing 145, and a bearing support 150 is provided. Referring to FIG. 5, the bearing support 150 is a substantially L-shaped support and includes a support portion 151 and a reinforcement portion 152, where the support portion 151 is disposed in the first body 111 and extends along the axis of the first body 111, and the reinforcement portion 152 is partially disposed outside the body and connected to the baseplate assembly 300.

Specifically, referring to FIG. 4, an electric motor bearing unit and an eccentric gear support unit are disposed on the support portion 151, the electric motor front bearing 143 is disposed in the electric motor bearing unit, an eccentric gear bearing is disposed in the eccentric gear support unit, and the support portion 151 mainly plays a supporting role; the reinforcement portion extends along a direction parallel to the baseplate 310, and the reinforcement portion includes a balance reinforcement portion 152 extending along a direction away from the first body 111.

The balance reinforcement portion 152 extending along the direction parallel to the baseplate 310 is provided, which can improve the connection strength between the bearing support 150 and the baseplate assembly 300 and the overall strength of the body. On the other hand, the balance reinforcement portion 152 extends along the direction away from the first body 111, which can improve the balance of the whole machine and avoid the imbalance of the body due to a relatively large weight of the first body 111, avoiding the need for the user to apply a relatively large force to the second body 112 to balance the whole machine during use and improving the operating experience of the user.

As shown in FIG. 5, the balance reinforcement portion 152 extends out of the first body 111, and the balance reinforcement portion 152 is connected to the rotary connecting portion 320 of the baseplate assembly 300 after extending out of the body. Since the rotary connecting portion 320 has a protruding outer circumferential surface, a recessed inner circumferential surface that mates with the outer circumferential surface is disposed at a bottom of the balance reinforcement portion 152, the outer circumferential surface and the inner circumferential surface are coaxially arranged, and the rotary connecting portion 320 is connected to the balance reinforcement portion 152 through the connecting assembly.

Specifically, referring to FIG. 5, the rotary connecting portion 320 includes an inner region closer to the baseplate 310 and an outer region farther from the baseplate 310, where a connecting hole 321 is disposed at the center of a top of the rotary connecting portion 320, and the connecting assembly includes a square nut 331, a clamping pressure plate 332 and a screw 333, where the clamping pressure plate 332 is disposed in the inner region in correspondence with the connecting hole 321, the square nut 331 is disposed in the outer region in correspondence with the connecting hole 321, and the screw 333 penetrates through the clamping pressure plate 332 and the connecting hole 321 in sequence and is fixedly connected to the square nut 331.

Optionally, the connecting hole 321 is an arc-shaped connecting hole extending along a circumferential direction and disposed on the outer circumferential surface of the rotary connecting portion 320, and the connecting assembly may adjust a position at which the bearing support 150 and the rotary connecting portion 320 are fixed so that the rotary connecting portion 320 of the baseplate assembly 300 is allowed to be rotatably connected to the first body 111 about the first axis 101, thereby achieving the oblique cutting of the jigsaw 100.

The reinforcement portion further includes an auxiliary reinforcement portion 153, where the auxiliary reinforcement portion 153 is webs that are disposed on two sides of the balance reinforcement portion and used for improving the support strength of the bearing support 150 and the whole machine.

The bearing support in the example of the present application further includes a reinforcement assembly 1501, where the reinforcement assembly 1501 mates with an inner housing of the body for reinforced fixation; the reinforcement assembly 1501 includes a connecting rib 155 and a connecting post 154, where the connecting rib 155 is disposed on a surface of the support portion 151 mating with the inner housing of the body, and the connecting post 154 is disposed on the reinforcement portion and, specifically, disposed on outer sides of the webs of the auxiliary reinforcement portion 153. The connecting rib 155 may mate with a groove on an inner wall of the first body so as to enhance the connection stability between the support portion of the bearing support and the body. Similarly, the connecting post 154 may mate with a hole on the inner wall of the first body and is used for enhancing the connection stability between the reinforcement portion of the bearing support and the body.

To further improve the connection strength between the bearing support and the body, the reinforcement assembly 1501 further includes a connecting boss 156 disposed on the support portion, and a screw connecting hole is disposed in the connecting boss 156. Correspondingly, a screw hole is disposed on an inner wall of the body, and the connecting boss 156 may be fixed to the body by using a screw, thereby further improving the connection strength between the bearing support and the body and making the connection more reliable and stable.

In this example, the bearing support 150 is an integral structure and may be an aluminum bearing support. The bearing support 150 may be another metal bearing support, which is not limited here.

The battery pack 200 is connected to a rear end of the second body 112 and supplies power to the power assembly. Specifically, the battery pack 200 is connected to a foot of the second body 112, and a control assembly is further disposed at the foot of the second body 112 and mainly includes a control circuit board.

Figure 6:
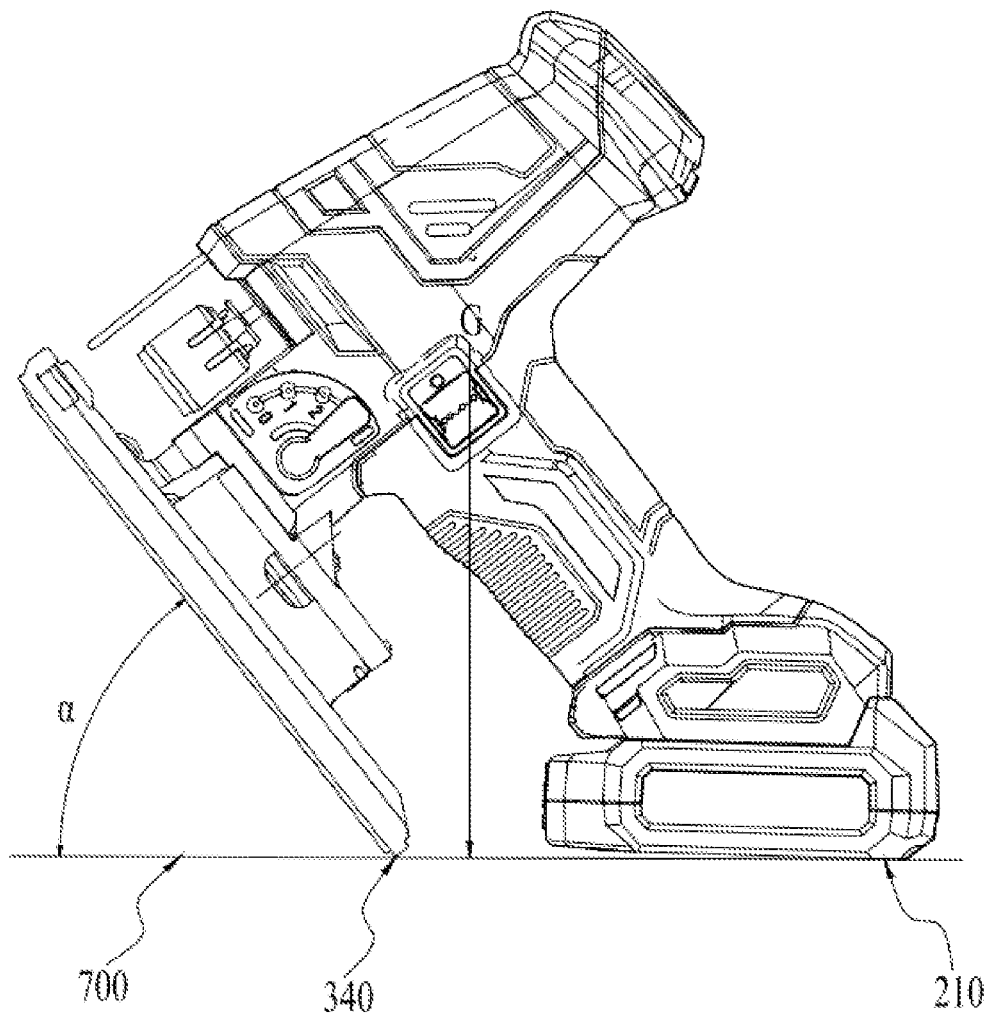
FIG. 6 is a schematic view of a jigsaw standing according to the present application.

Referring to FIG. 6, the battery pack 200 includes a first support unit 210, and the baseplate assembly 300 includes a second support unit 340, where the first support unit 210 and the second support unit 340 are disposed in the same support plane 700; the first support unit 210 and the second support unit 340 together support the jigsaw 100 so that the jigsaw 100 stands, and the work attachment 400 faces the support plane 700 when the tool stands.

The first support unit and the second support unit are disposed on the tool so that the tool can stand on a workbench surface in breaks during use, thereby avoiding the case where the work attachment is exposed when the tool is laid on the workbench surface since the tool cannot stand and avoiding safety hazards due to the sliding or falling of the tool.

The first support unit 210 is configured to be a line support unit or a surface support unit, and the second support unit 340 may also be configured to be a line support unit or a surface support unit. In this example, a partial housing on the battery pack 200 constitutes the first support unit 210, where part of the housing of the battery pack 200 may be in line contact with or in surface contact with the workbench surface. For example, an entire bottom surface of the battery pack 200 may be used as the first support unit 210, where the bottom surface refers to a surface of the battery pack opposite to a plug end. In this example, a rear side of the baseplate 310 facing away from the output member constitutes the second support unit 340, where the rear side refers to a side at the rear of the baseplate 310.

The rear side of the baseplate 310 and part of the housing of the battery pack 200 together support the tool so that on the one hand, the tool can stand in the breaks during use, thereby avoiding safety hazards brought by the tool directly laid on an operation bench surface; on the other hand, on the basis of ensuring that the tool stands, the work attachment faces the support plane 700, thereby avoiding the repeated disassembly and assembly of the work attachment in the breaks during use for the sake of safety.

In this example, the first support unit 210 and the second support unit 340 are spaced apart, and when the tool stands, a projection of a center of gravity of the tool on the support plane 700 is located between the first support unit 210 and the second support unit 340. Through the preceding arrangement, the tool stands more stably, thereby preventing the tool from tipping due to standing instability. When the tool stands, an included angle between a surface of the baseplate 310 and the support plane 700 is α, where 35°≤α≤60° and optionally, 45°≤α≤50°.

Through the preceding setting of the angle, on the basis of ensuring that the tool stands, it is further ensured that the work attachment on the tool is as close to the operation bench surface as possible when the tool stands, thereby further improving the safety of the tool standing and preventing the work attachment from accidentally injuring an operator when the tool stands.

In this example, the jigsaw 100 includes two grips including a first grip 1110 on the first body 111 and a second grip 1120 on the second body 112. When operating the jigsaw 100, the user may hold the jigsaw 100 by the first grip 1110, by the second grip 1120, or by the first grip 1110 and the second grip 1120 with both hands separately. In this example, a front end of the first body 111 constitutes the first grip 1110, the user may hold the front end of the first body 111 with the palm, the thumb surrounds the first body 111 to a rear side of a top of the first body 111, and an outer circumferential wall of the second body 112 constitutes the second grip 1120.

As shown in FIG. 2, the first grip 1110 further includes a first resilient portion 1111, and similarly, the second grip 1120 includes a second resilient portion 1121, where the second resilient portion 1121 almost completely covers the outer circumferential wall of the second body 112.

The first resilient portion 1111 covers at least a front wall of the first body 111, where the first resilient portion 1111 covers the housing of the first body 111 at an area ratio of greater than or equal to 50%, and more than 50% of the housing of the first body 111 is covered with the first resilient portion.

In this example, the first resilient portion 1111 covers the front wall of the first body 111 and extends from the front wall to sidewalls and a top wall to cover part of the sidewalls and the top wall. The first resilient portion 1111 is provided, which can improve the user's feeling of use and reduce the operation fatigue due to vibration during cutting.

Figure 7:
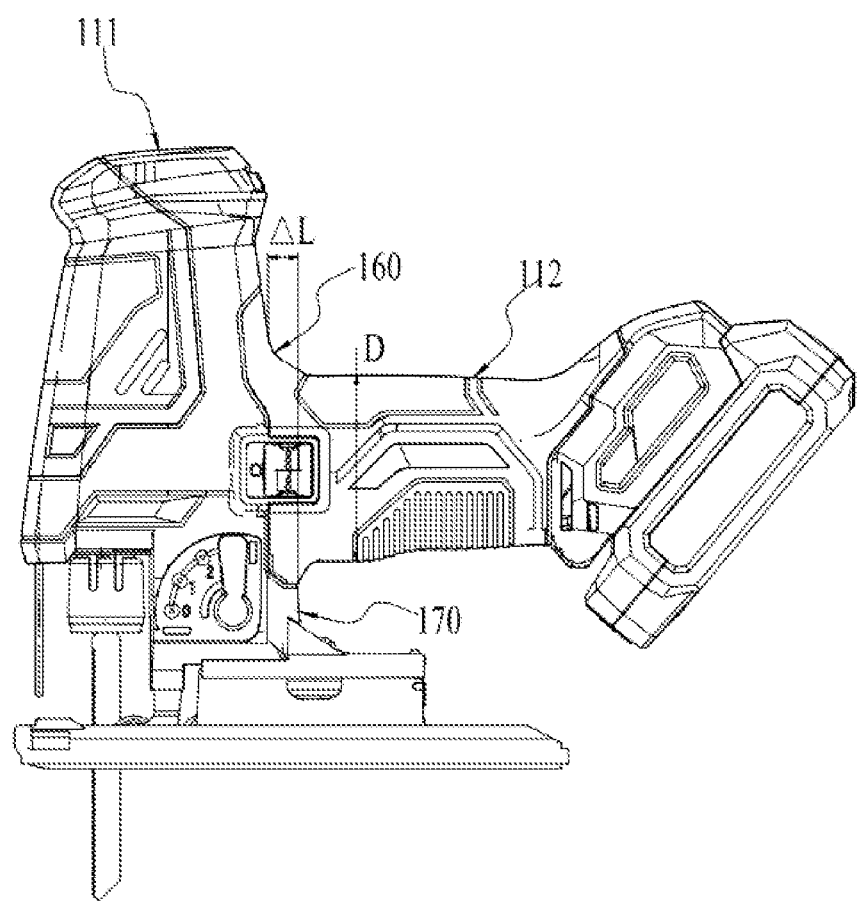
FIG. 7 is a schematic view of finger stop portions of a jigsaw according to the present application.

Referring to FIG. 7, in the present application, the first body 111 includes an upper finger stop portion 160 and a lower finger stop portion 170 that are disposed on a rear sidewall of the first body 111, where the upper finger stop portion 160 is disposed above the second body 112, and the lower finger stop portion 170 is disposed below the second body 112. A distance between the upper finger stop portion 160 and the lower finger stop portion 170 along the front and rear direction is ΔL, where −15 mm≤ΔL≤30 mm, ΔL less than 0 means that the lower finger stop portion 170 is disposed behind the upper finger stop portion 160, and ΔL greater than 0 means that the upper finger stop portion 160 is disposed in front of the lower finger stop portion 170. At the same time, if an outer diameter of the second body 112 is D, 35 mm≤D≤65 mm. In this example, two holding positions are provided, where a first holding position is that the upper finger stop portion 160 is disposed in front of the lower finger stop portion 170. In this case, the distance ΔL between the upper finger stop portion 160 and the lower finger stop portion 170 satisfies that 3 mm<ΔL≤15 mm.

In the related art, to make the whole machine compact in structure, three fingers are not allowed to surround a body at a position where the body is held. Generally, the thumb and the index finger of the user surround a grip, and the remaining fingers are in contact with a sidewall of the body. Therefore, when the machine is held, the machine can only be held through a clamping force at the purlicue between the thumb and the index finger. Such a grip is laborious and unreliable, and the user easily feels uncomfortable when operating the machine for a long time.

In the example of the present application, the distance between the upper finger stop portion 160 and the lower finger stop portion 170 along the front and rear direction is within the preceding range so that the user can hold the tool with at least three fingers, that is, at least three fingers are allowed to surround a lower part of the second body. In this case, the fingers below the second body 112 are close to the lower finger stop portion 170, and the purlicue of the user is close to the upper finger stop portion 160. Such a grip is reliable and has a relatively high degree of comfort, which is convenient for the user to easily handle and place the machine.

As an alternative example, it may be set that the distance ΔL between the lower finger stop portion 170 and the upper finger stop portion 160 satisfies that −10 mm≤ΔL≤3 mm.

The distance between the upper finger stop portion 160 and the lower finger stop portion 170 along the front and rear direction is configured to be within the preceding range so that the user can hold the tool with at least four fingers, that is, at least four fingers are allowed to surround the lower part of the second body. Such a grip is conducive to the improvement of the gripping comfort and reliability of the user.

In the example of the present application, a dimension of the second body 112 is configured to be within the preceding range, which is conducive to the gripping of the user with a single hand, thereby improving a ratio of a gripping area of the hand of the user to an outer circumferential surface of the second body and improving the gripping reliability. At the same time, the setting of relative positions of front and rear finger stops makes the user hold the tool more comfortably, which is conducive to the improvement of user experience; and three or even four fingers of the user are allowed to hold the tool, thereby improving the gripping comfort of the user and the user's handling of the machine.

Figure 8:
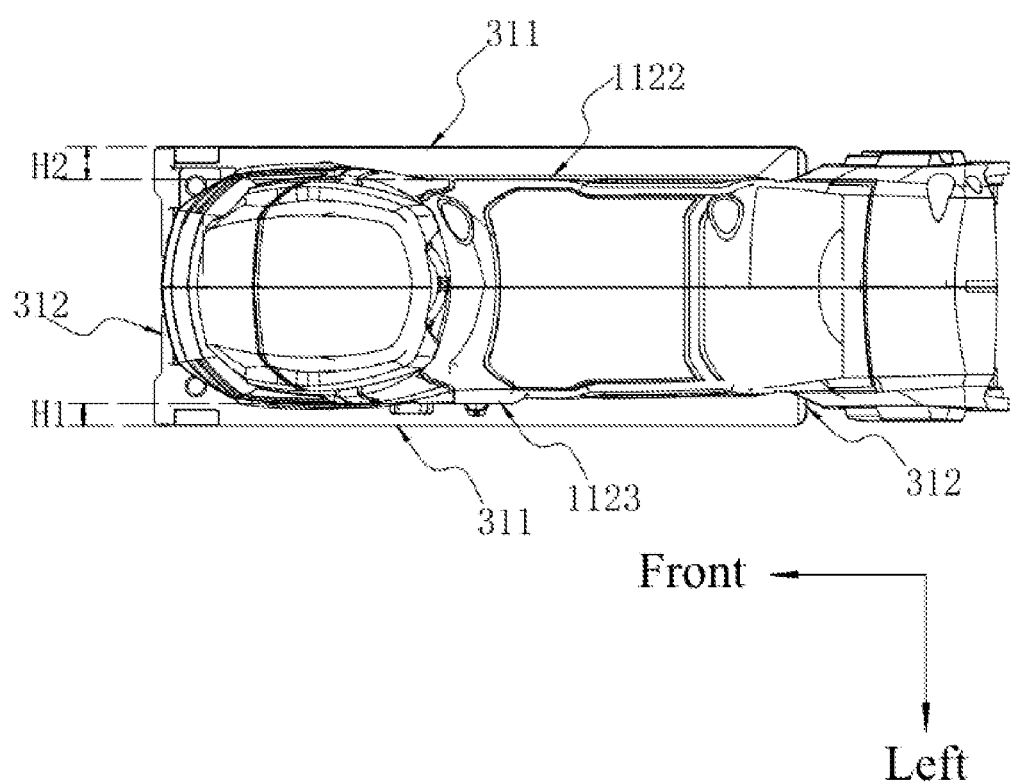
FIG. 8 is a top view of the jigsaw in FIG. 1.

As shown in FIG. 5, in this example, the baseplate 310 includes a pair of first sides 311 extending along the front and rear direction and a pair of second sides 312 extending along a left and right direction, where the first sides are perpendicular to the second sides 312, and the second sides 312 are shorter than the first sides 311. Referring to FIG. 8, a projection of the second body 112 on the baseplate 310 includes a left limit outer edge 1123 and a right limit outer edge 1122, where both the left limit outer edge 1123 and the right limit outer edge 1122 are located between the pair of first sides 311; and the left limit outer edge 1123 is spaced apart from the first side 311 adjacent to the left limit outer edge 1123, and the right limit outer edge 1122 is spaced apart from the other first side 311' adjacent to the right limit outer edge 1122.

A distance H1 between the left limit outer edge 1123 and the first side 311 adjacent to the left limit outer edge 1123 along the left and right direction is greater than or equal to 5 mm and less than or equal to 15 mm; similarly, a distance H2 between the right limit outer edge and the other first side adjacent to the right limit outer edge along the left and right direction is greater than or equal to 5 mm or less than or equal to 15 mm.

In this example, the left limit outer edge refers to an edge of the housing of the second body 112 at a leftmost end, that is, a contour line or point closest to the first side 311 on a left side; and the right limit outer edge refers to an edge of the housing of the second body 112 at a rightmost end, that is, a contour line or point closest to the first side 311 on a right side.

Referring to FIG. 8, the right limit outer edge 1122 is on an upper side of the figure and the left limit outer edge 1123 is on a lower side of the figure, where the left and right limit outer edges of the second body are configured between the pair of first sides of the baseplate so that a gap exists between the second body 112 and an edge of the first side of the baseplate when the tool is used vertically, which is conducive to the operation of the tool in a narrow space. For example, when the first side 311 of the baseplate is operated against a wall or an outer wall of an object, a gap exists between an outer wall of the second body 112 and the wall or the outer wall of the object and there is a space for the user to hold the tool.

Figure 9:
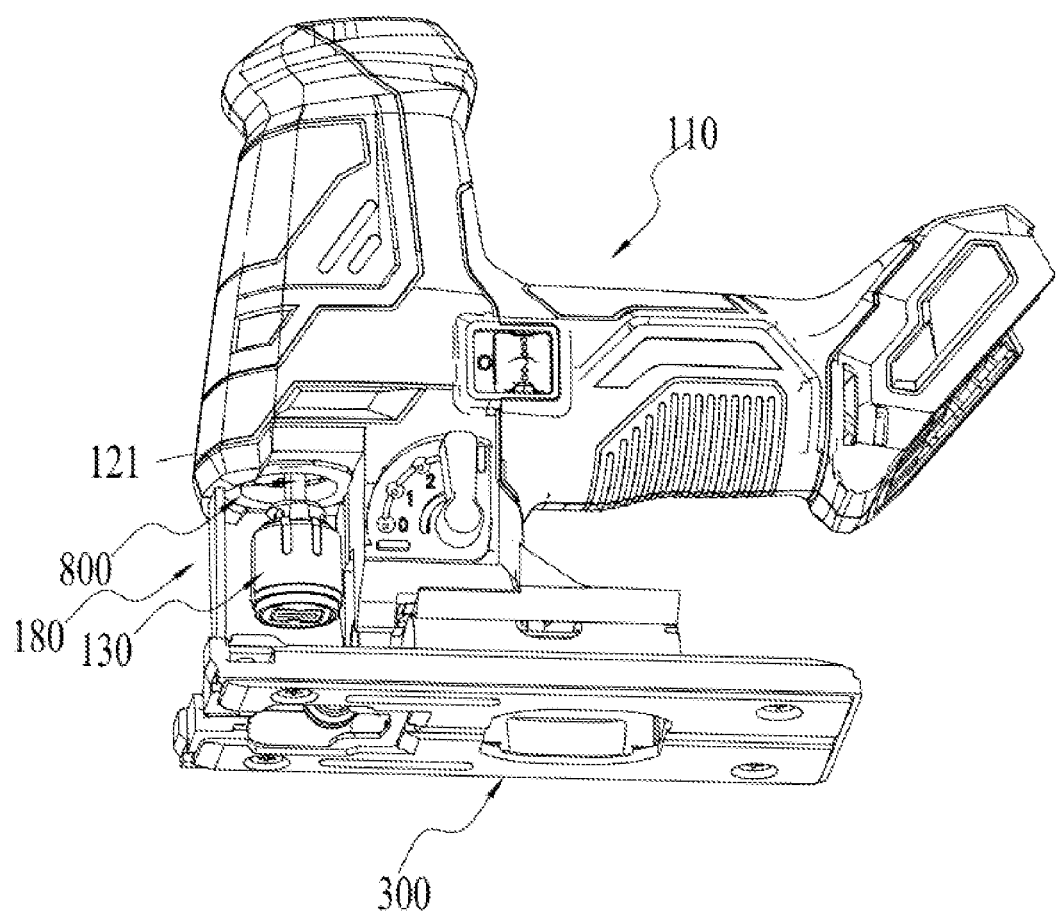
FIGS. 9 and 10 are main views of a lighting unit according to the present application.
Figure 10:
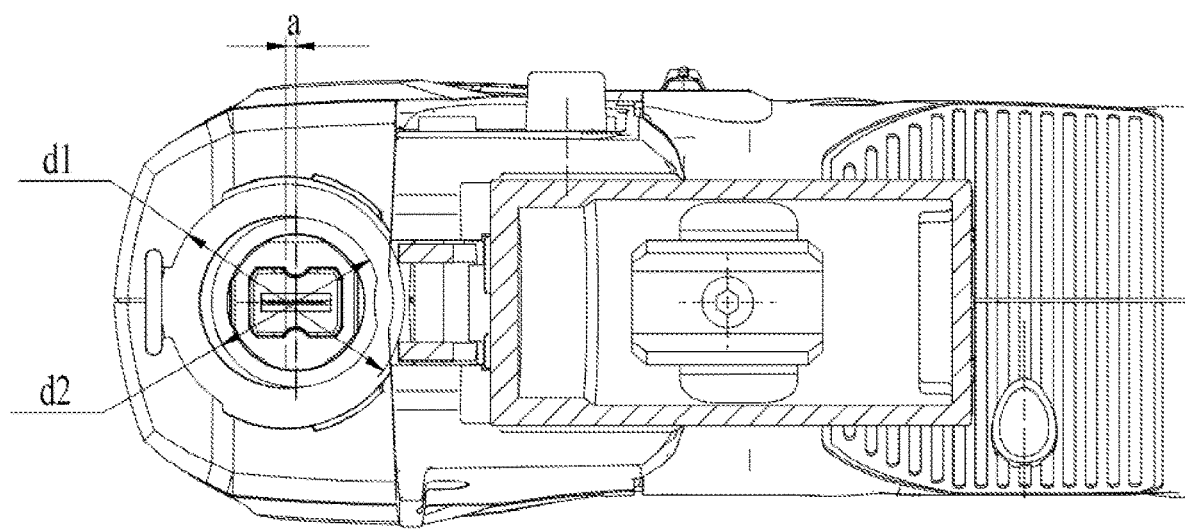

Referring to FIGS. 9 to 10, in the example of the present application, the jigsaw 100 further includes a lighting unit 800 disposed at an output end 180, where the lighting unit 800 is connected to a control mechanism through a wire. The lighting unit 800 is disposed around or partially around the output member 120, where the lighting unit 800 in this example is a ring-shaped lighting unit and disposed eccentrically to the output member. The lighting unit 800 may be an unclosed ring lighting unit or a horseshoe-shaped lighting unit, which is not limited here.

Referring to FIG. 10, a distance a between a central axis of the ring-shaped lighting unit 800 and a central axis of the output member 120 is greater than 0 mm and less than or equal to 5 mm.

Specifically, referring to FIGS. 9 and 10, in the example of the present application, the clamping device 130 is substantially cylindrical, where an outer diameter of the lighting unit 800 is greater than an outer diameter of the clamping device 130, and a ratio of the outer diameter d1 of the lighting unit 800 to the outer diameter d2 of the clamping device 130 is greater than 1 and less than 3, that is, 1<d1/d2<3.

The lighting unit 800 is disposed eccentrically to the clamping device 130, which helps the lighting unit 800 to irradiate a cutting position of the work attachment more clearly, thereby preventing the cutting position of the work attachment from being in a blind region of the lighting unit 800. In this manner, clearer irradiation is achieved. At the same time, the outer diameter of the lighting unit 800 and the outer diameter of the clamping device 130 are limited within the preceding ranges, thereby avoiding too small of an irradiation range of the lighting unit 800 with too small a dimension and avoiding an insufficient light intensity of the lighting unit 800 with too large a dimension. Therefore, the preceding arrangement ensures that the lighting unit 800 can irradiate and cover a certain range around the work attachment and can irradiate the work attachment clearly.

In the present application, the jigsaw 100 further includes a switch assembly, where the switch assembly 500 in this example includes a push button 510, a pull rod 520, and a switch 530, where the switch 530 is disposed in the second body 112, the push button 510 is connected to the pull rod 520, the push button 510 is disposed outside the second body 112, the pull rod 520 is disposed in the second body 112 and extends along an axial direction of the second body 112, and the push button 510 is toggled to drive the pull rod 520 to move along the axial direction of the second body 112.

Figure 12:
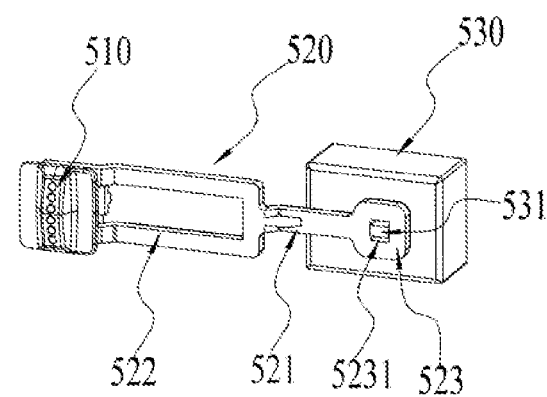
FIG. 12 is a structural view of the switch assembly in FIG. 11.

As shown in FIG. 12, the push button 510 is disposed on the pull rod 520, and the pull rod 520 includes a trigger portion 523, a thin neck portion 521 and a connecting portion 522, where the trigger portion 523 is used for triggering the switch 530, and the connecting portion 522 connects the thin neck portion 521 to the push button 510.

Figure 11:
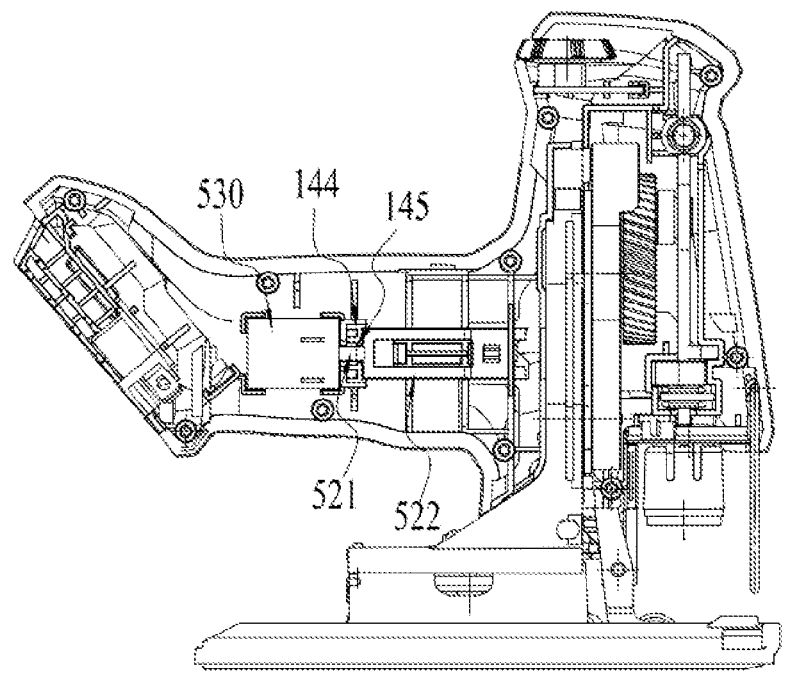
FIG. 11 is a schematic view illustrating the assembly of a rear bearing housing of an electric motor and a switch assembly according to the present application.

Specifically, as shown in FIG. 11, an opening 1451 through the rear bearing housing 145 is disposed in the rear bearing housing 145 in the second body 112, and the thin neck portion 521 penetrates through the opening 1451 and slides in the opening 1451. The trigger portion 523 is provided with a connecting hole 5231, and the connecting hole 5231 is connected to a trigger unit of the switch 530, where the trigger unit of the switch 530 is specifically a toggle 531, the connecting hole 5231 is sleeved on the toggle 531, and the pull rod 520 is driven by the push button 510 to reciprocate to drive the toggle 531 to be turned on or off. The switch 530 is electrically connected to the control assembly through a wire and may control the start and stop of the electric motor 141 through the control assembly.

The connecting portion 522 is provided with a guide for guiding the push rod 520 to be slidably connected to an inner wall of the second body 112. Specifically, the guide includes a sliding groove disposed on the connecting portion 522 and a guide rib disposed on the inner wall of the second body 112. The guide rib may be disposed on the connecting portion 522, and a guide groove may be cut on the inner wall of the second body 112, which is not limited here.

Generally, according to gripping habits, when the user holds the tool, the fingers are generally close to a front end of the body. Therefore, the push button is disposed at the front end, which is conducive to the operation of the user. In this example, the pull rod including the thin neck portion for the switch is provided so that the thin neck portion penetrates through the rear bearing housing 145 of the electric motor. On this basis, not only is the push button 510 disposed at a front position on the second body, but also the pull rod 520 is electrically connected to the switch 530 disposed on a rear side of the second body. In addition, an additional space in the second body does not need to be reserved for arranging the pull rod, thereby reducing the dimension of the second body, in particular an outer radial dimension of the second body.

Figure 13:
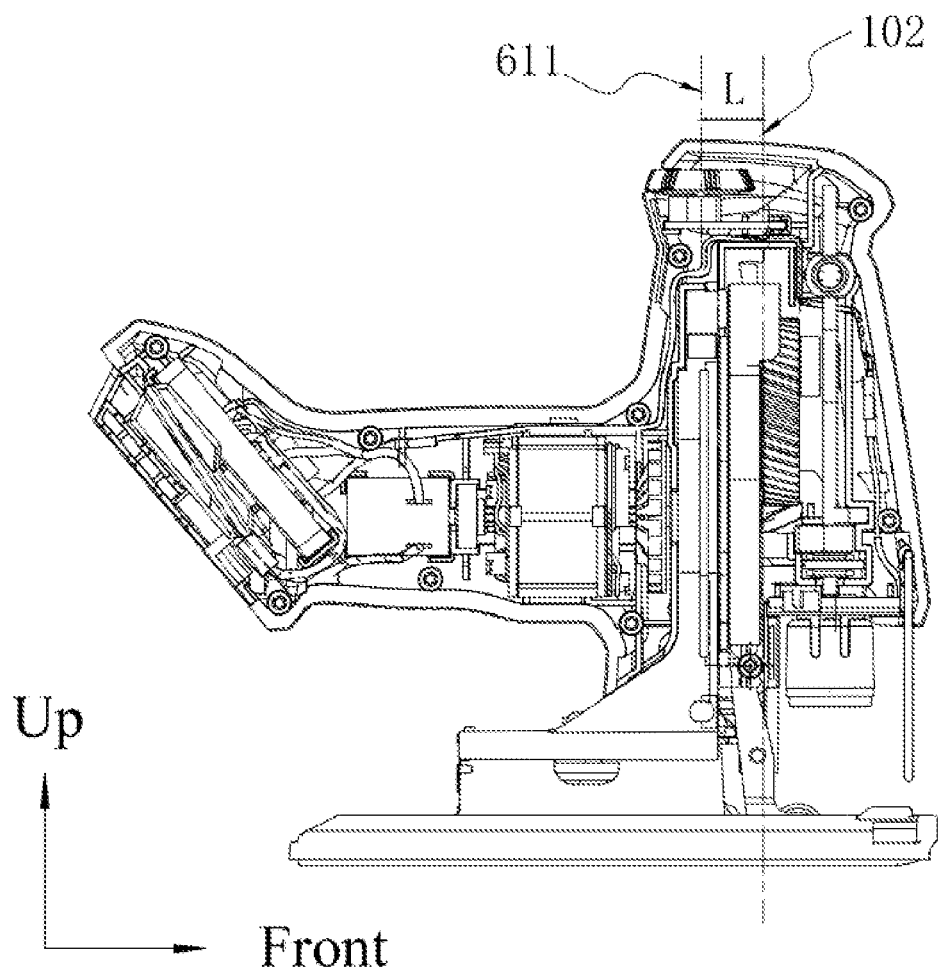
FIG. 13 is a schematic view illustrating a relationship between a speed regulation knob and a first body according to the present application.

Referring to FIG. 13, in the present application, the jigsaw 100 further includes a speed regulation assembly 600, where the speed regulation assembly 600 includes a speed regulation knob 610, a speed regulation circuit board and a speed regulation wire, where the speed regulation assembly 600 is electrically connected to the battery pack 200 through a wire, and the speed regulation circuit board is connected to a circuit board of the control mechanism through a wire and used for controlling the speed regulation of the electric motor 141. The speed regulation knob 610 is disposed at the top of the first body 111 and has an axis of rotation 611 about which the speed regulation knob 610 is rotatable, where the axis of rotation 611 is perpendicular to the baseplate 310, or the axis of rotation 611 is parallel to the baseplate 310. The speed regulation knob 610 is disposed at the top of the first body 111 so that the user can conveniently perform a speed regulation operation when holding the tool.

As shown in FIG. 13, in the example of the present application, the axis of rotation 611 of the speed regulation knob 610 is perpendicular to the baseplate, and a distance L between the axis of rotation 611 and the first body axis 102 is greater than or equal to 10 mm and less than or equal to 25 mm.

Figure 14:
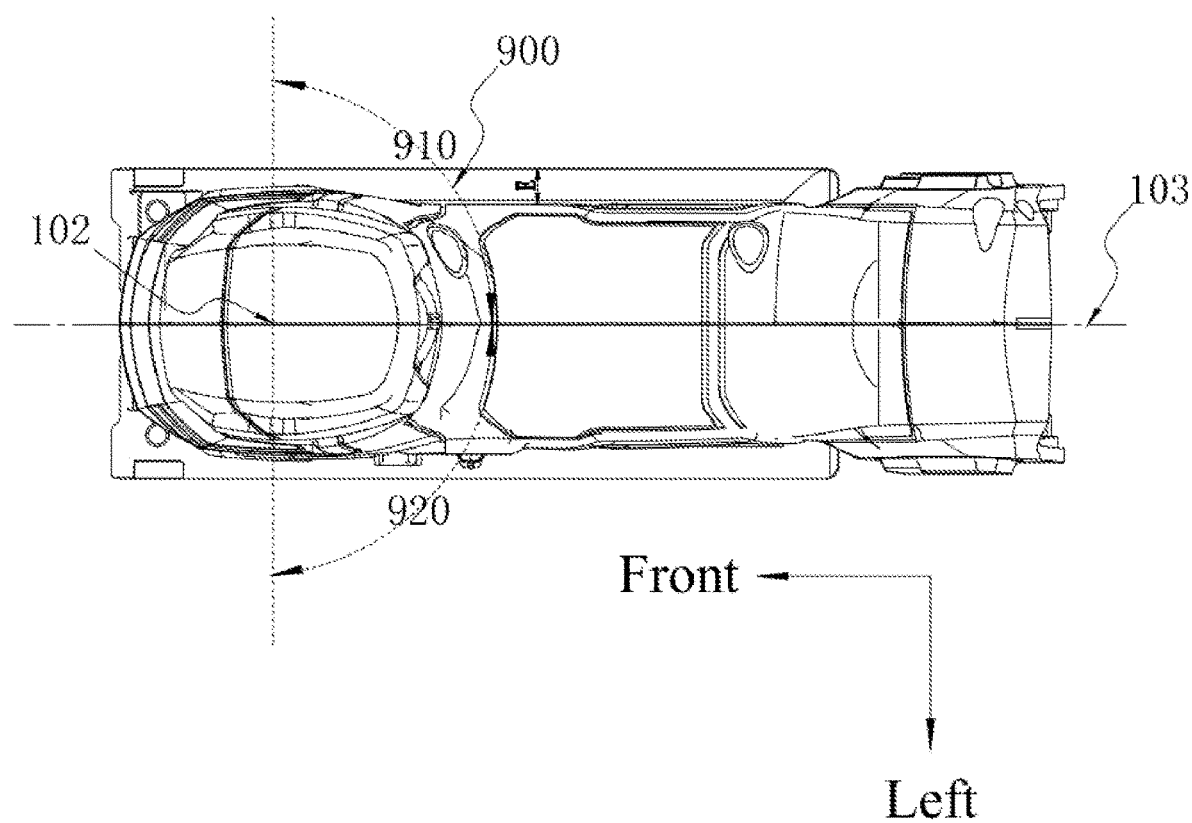
FIG. 14 is a schematic view of a distribution position of a speed regulation knob according to the present application.

Specifically, referring to FIG. 14, the speed regulation knob 610 is disposed in a mounting region 900 on a rear side of the first body 111. Specifically, a knob center 612 of the speed regulation knob 610 is located in the mounting region 900. The mounting region 900 includes a first mounting region 910 and a second mounting region 920, where the first mounting region 910 refers to a region where the second body axis 103 rotates clockwise around the first body axis 102 by substantially 90° and the second mounting region 920 refers to a region where the second body axis 103 rotates counterclockwise around the first body axis 102 by substantially 90°. The speed regulation knob 610 is configured in the preceding manner, which is conducive to the speed regulation operation of the user, thereby improving the user experience.

What is claimed is:

1. A power tool, comprising:
   a body;
   a power assembly disposed in the body;
   an output member driven by the power assembly to output power;
   a clamping device connected to the output member and used for clamping a work attachment;
   a battery pack connected to the body and supplying power to the power assembly; and
   a baseplate assembly connected to the body and comprising a baseplate in contact with a workpiece;
   wherein the battery pack comprises a first support unit, the baseplate comprises a second support unit, and the first support unit and the second support unit are disposed in a same support plane, the first support unit and the second support unit support the power tool together so that the power tool stands, and the work attachment faces the support plane when the power tool is placed into a standing orientation.

2. The power tool of claim 1, wherein the first support unit is configured to be a line support unit or a surface support unit and the second support unit is configured to be a line support unit or a surface support unit.

3. The power tool of claim 2, wherein a partial housing on the battery pack constitutes the first support unit and a rear side of the baseplate facing away from the output member constitutes the second support unit.

4. The power tool of claim 2, wherein the first support unit and the second support unit are spaced apart and when, the power tool is placed into the standing orientation, a projection of a center of gravity of the power tool on the support plane is located between the first support unit and the second support unit.

5. The power tool of claim 1, wherein when the power tool is placed into the standing orientation, an included angle between a surface of the baseplate and the support plane is α, wherein 35°≤α≤60°.

6. The power tool of claim 1, wherein the body comprises a first body and a second body, the first body is connected to the baseplate assembly, a rear end of the second body is connected to the battery pack, the first body and the second body are disposed at an angle, the power assembly is supported in the body through a bearing support, the bearing support comprises a support portion and a reinforcement portion, the support portion is disposed in the body, the reinforcement portion extends out of the body and is connected to the baseplate assembly, and the reinforcement portion comprises a balance reinforcement portion extending along a direction away from the first body.

7. The power tool of claim 6, wherein the baseplate comprises a connecting portion, the balance reinforcement portion is connected to the connecting portion, the reinforcement portion further comprises an auxiliary reinforcement portion, and the auxiliary reinforcement portion comprises webs disposed on two sides of the balance reinforcement portion.

8. The power tool of claim 7, wherein the bearing support further comprises a reinforcement assembly, the reinforcement assembly mates with and is fixed to an inner housing of the body, the reinforcement assembly comprises a connecting rib and a connecting post, the connecting rib is disposed on a surface of the support portion mating with the inner housing of the body, and the connecting post is disposed on the reinforcement portion.

9. The power tool of claim 8, wherein the reinforcement assembly further comprises a connecting boss disposed on the support portion and a screw connecting hole is disposed in the connecting boss.

10. The power tool of claim 6, comprising a first grip disposed on the first body and a second grip disposed on the second body.

11. The power tool of claim 10, wherein the first grip further comprises a first resilient portion and the first resilient portion covers a housing of the first body at an area ratio of greater than or equal to 50%.

12. The power tool of claim 11, wherein the first resilient portion covers at least a front wall of the first body.

13. The power tool of claim 1, wherein the body comprises a first body and a second body, the first body extends along an up and down direction, the second body extends along a front and rear direction, and the first body is disposed in front of the second body.

14. The power tool of claim 13, wherein the power assembly is disposed in the second body, the output member is connected to the first body, and the battery pack is connected to the second body.

15. The power tool of claim 14, wherein the first body comprises an upper finger stop portion and a lower finger stop portion that are disposed on a rear sidewall of the first body, the upper finger stop portion is disposed above the second body, the lower finger stop portion is disposed below the second body, an outer diameter of the second body is greater than or equal to 35 mm and less than or equal to 65 mm, a distance between the upper finger stop portion and the lower finger stop portion along the front and rear direction is ΔL, −15 mm≤ΔL≤30 mm, ΔL less than 0 means that the upper finger stop portion is disposed behind the lower finger stop portion, and ΔL greater than 0 means that the upper finger stop portion is disposed in front of the lower finger stop portion.

16. The power tool of claim 15, wherein the upper finger stop portion is disposed in front of the lower finger stop portion and 3 mm<$\Delta L \leq$15 mm.

17. The power tool of claim 13, wherein the distance between the upper finger stop portion and the lower finger stop portion along the front and rear direction is $\Delta L$ and −10 mm<$\Delta L \leq$3 mm.

18. The power tool of claim 13, comprising a speed regulation assembly comprising a speed regulation knob and electrically connected to the battery pack, the speed regulation knob is disposed at a top of the first body and comprises an axis of rotation about which the speed regulation knob is rotatable, and the axis of rotation is perpendicular to the baseplate or the axis of rotation is parallel to the baseplate.

19. The power tool of claim 1, comprising an output member connected to the first body and driven by the power assembly to output power; wherein the body comprises an output end, the output member is provided at the output end, a lighting unit is provided at the output end and disposed around or partially around the output member, and the lighting unit is disposed eccentrically to the output member.

20. The power tool of claim 19, wherein the lighting unit is a ring member or the lighting unit is an unclosed ring member and a distance between a central axis of the lighting unit and a central axis of the output member is greater than 0 mm and less than or equal to 5 mm.

* * * * *

UNITED STATES PATENT AND TRADEMARK OFFICE
CERTIFICATE OF CORRECTION

PATENT NO. : 12,042,920 B2
APPLICATION NO. : 17/977295
DATED : July 23, 2024
INVENTOR(S) : Shichun Tao and Lai Liu It is certified that error appears in the above-identified patent and that said Letters Patent is hereby corrected as shown below:

On the Title Page

Please Add:
Item [30] Foreign Application Priority Data
June 16, 2020 (CN) ................ 202010546113

Signed and Sealed this
Twelfth Day of November, 2024

Katherine Kelly Vidal
*Director of the United States Patent and Trademark Office*